United States Patent
Wu et al.

(10) Patent No.: US 10,082,111 B2
(45) Date of Patent: Sep. 25, 2018

(54) TURBOCHARGING SYSTEM WITH ELECTRIC MOTOR(S)

(71) Applicant: GM GLOBAL TECHNOLOGY OPERATIONS LLC, Detroit, MI (US)

(72) Inventors: Ko-Jen Wu, West Bloomfield, MI (US); Jason G Kohler, White Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 406 days.

(21) Appl. No.: 14/837,329

(22) Filed: Aug. 27, 2015

(65) Prior Publication Data

US 2017/0058840 A1    Mar. 2, 2017

(51) Int. Cl.
   *F02D 23/00*    (2006.01)
   *F02M 26/08*   (2016.01)
   (Continued)

(52) U.S. Cl.
   CPC .............. *F02M 26/08* (2016.02); *F01N 5/04* (2013.01); *F02B 37/002* (2013.01);
   (Continued)

(58) Field of Classification Search
   CPC .... F02B 37/001; F02B 37/004; F02B 37/007; F02B 37/013; F02B 37/025; F02B 39/10
   (Continued)

(56) References Cited

U.S. PATENT DOCUMENTS

2002/0073981 A1 *  6/2002  Coleman ............... F02B 37/013
                                                    123/605
2006/0042247 A1 *  3/2006  Haugen .................. F01D 9/026
                                                    60/612
(Continued)

FOREIGN PATENT DOCUMENTS

CN          104343528 A      2/2015
DE     102014211128 A1 * 12/2015  ............ F02B 37/013
(Continued)

OTHER PUBLICATIONS

Machine generated translation of DE 102014211128 A1.*
Machine generated translation of JP 06229253 A.*

*Primary Examiner* — Ngoc T Nguyen
(74) *Attorney, Agent, or Firm* — Quinn IP Law

(57) ABSTRACT

An internal combustion engine includes a cylinder block defining a cylinder and a cylinder head mounted to the block. The cylinder head supplies air and fuel to the cylinder for combustion therein. The engine also includes an exhaust manifold operatively connected to the cylinder head and having first and second outlets configured to exhaust post-combustion gasses from the cylinder. The engine also includes a turbocharging system including a low-flow turbocharger driven by the post-combustion gasses from the first outlet to pressurize the airflow and a high-flow turbocharger driven by the post-combustion gasses from the second outlet. The turbocharging system also includes a flow control device for selectively directing the post-combustion gasses to the low-flow and high-flow turbochargers. The (Continued)

turbocharging system additionally includes a motor-generator to selectively assist the post-combustion gasses in driving either the low-flow or the high-flow turbocharger and generate electric current when driven via the subject turbocharger.

13 Claims, 5 Drawing Sheets

(51) Int. Cl.
*F02B 63/04* (2006.01)
*F02B 37/00* (2006.01)
*F02B 37/02* (2006.01)
*F02B 39/10* (2006.01)
*F01N 5/04* (2006.01)
*F02F 1/24* (2006.01)

(52) U.S. Cl.
CPC .......... *F02B 37/004* (2013.01); *F02B 37/025* (2013.01); *F02B 39/10* (2013.01); *F02B 63/04* (2013.01); *F02F 1/243* (2013.01); *F01P 2060/12* (2013.01); *Y02T 10/144* (2013.01)

(58) Field of Classification Search
USPC .............................................. 60/612; 123/562
See application file for complete search history.

(56) References Cited

U.S. PATENT DOCUMENTS

| | | | | |
|---|---|---|---|---|
| 2010/0284824 | A1* | 11/2010 | Hippen | F01M 11/02 417/44.1 |
| 2013/0209291 | A1* | 8/2013 | Kitsukawa | F02B 37/013 417/410.1 |
| 2014/0298799 | A1* | 10/2014 | Wu | F01N 13/10 60/602 |
| 2015/0226109 | A1* | 8/2015 | Hegner | F02B 37/004 60/607 |

FOREIGN PATENT DOCUMENTS

| | | | | |
|---|---|---|---|---|
| EP | 2573356 A2 | * | 3/2013 | ............ F02B 37/004 |
| JP | 06229253 A | * | 8/1994 | ............ F02B 37/001 |
| JP | 3160822 B2 | * | 4/2001 | ............ F02B 37/001 |
| WO | WO 2008157109 A2 | * | 12/2008 | ............ F01D 17/105 |

* cited by examiner

TURBOCHARGING SYSTEM WITH ELECTRIC MOTOR(S)

TECHNICAL FIELD

The present disclosure relates to a turbocharging system employing electric motor(s) for boosting an internal combustion engine.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

A typical turbocharger includes a central shaft that is supported by one or more bearings and transmits rotational motion between an exhaust-driven turbine wheel and an air compressor wheel. Both the turbine and compressor wheels are fixed to the shaft, which in combination with various bearing components constitute the turbocharger's rotating assembly.

The inertia of such a rotating assembly typically impacts the response of a turbocharger, wherein the diameter of the turbine wheel is one of the main factors. On the other hand, because the turbocharger is generally efficient over a specific range of rotational speeds and airflows, the diameter of the turbine wheel is also a major factor behind generating the necessary airflow for increased engine power. Such considerations frequently demand a compromise between maximum engine power output and response.

SUMMARY

One embodiment of the disclosure is directed to an internal combustion engine that includes a cylinder block defining a cylinder and a cylinder head mounted to the block. The cylinder head supplies air and fuel to the cylinder for combustion therein. The engine also includes an exhaust manifold operatively connected to the cylinder head and having a first outlet and a second outlet configured to exhaust post-combustion gasses from the cylinder. The engine also includes a turbocharging system including a low-flow turbocharger driven by the post-combustion gasses from the first outlet to pressurize the airflow and a high-flow turbocharger driven by the post-combustion gasses from the second outlet. The turbocharging system also includes a flow control device for selectively directing the post-combustion gasses to the low-flow and high-flow turbochargers. The turbocharging system additionally includes a first motor-generator operatively connected to either the low-flow turbocharger or the high-flow turbocharger and configured to selectively assist the post-combustion gasses in driving and to generate electric current when driven via the turbocharger the first motor-generator is connected to.

The engine may additionally include a second motor-generator configured to selectively assist the post-combustion gasses in driving the other of the low-flow turbocharger and high-flow turbocharger and to generate electric current when driven via the other turbocharger.

Each of the low-flow turbocharger and high-flow turbocharger may include a bearing system arranged inside a bearing housing and configured to support rotating components of the respective low-flow and high-flow turbochargers. In such a case, each of the first and second motor-generators may be arranged inside the respective bearing housing of the low-flow and high-flow turbochargers.

The bearing housing of each of the low-flow turbocharger and high-flow turbocharger may include a coolant jacket. In such a case, the first motor-generator and the second motor-generator may be cooled by the respective coolant jackets of the low-flow turbocharger and high-flow turbocharger.

The engine may additionally include a programmable controller configured to regulate and coordinate operation of the flow control device, the first motor-generator, and the second motor-generator.

The controller may be programmed to close the flow control device and selectively operate the first motor-generator to assist the post-combustion gasses in driving the low-flow turbocharger below a predetermined flow rate of the post-combustion gasses. The controller may be also programmed to open the flow control device at or above the predetermined flow rate of the post-combustion gasses and selectively operate the second motor-generator to generate electric current when driven via the high-flow turbocharger.

The engine may be employed in a vehicle having an electrical energy storage device. In such a case, the controller may be additionally programmed to direct the electric current generated by each of the first motor-generator and the second motor-generator to the energy storage device.

Another embodiment of the present disclosure is directed to a vehicle employing the engine as described above.

Yet another embodiment of the present disclosure is directed to a method of controlling such an internal combustion engine.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
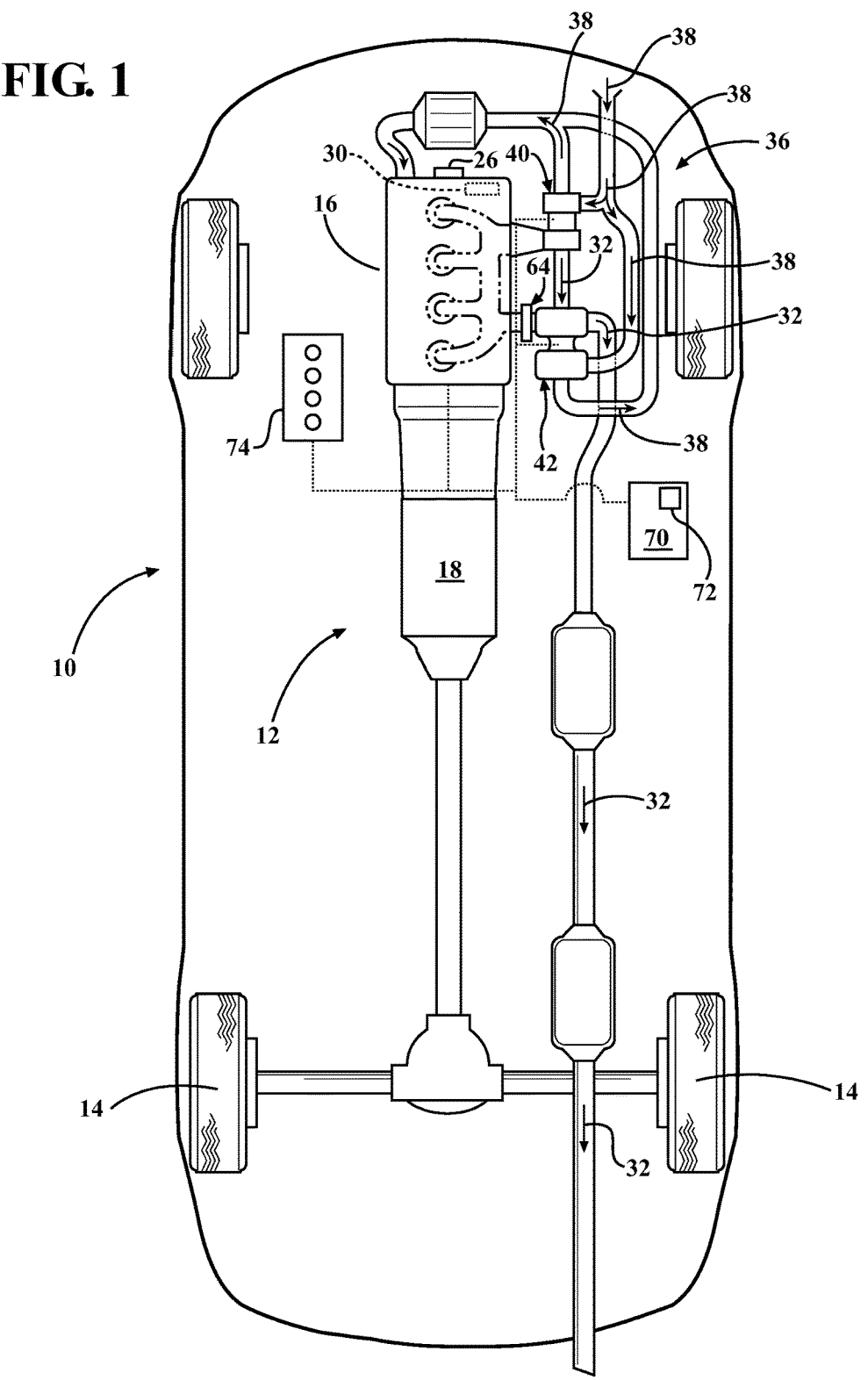
FIG. 1 is a schematic depiction of a vehicle having an engine with a two-stage turbocharging system according to the disclosure.

Referring to the drawings, wherein like reference numbers correspond to like or similar components throughout the several figures, FIG. 1 illustrates a vehicle 10 employing a powertrain 12 for propulsion thereof via driven wheels 14. As shown, the powertrain 12 includes an internal combustion engine 16, such as a spark- or compression-ignition type, and a transmission assembly 18 operatively connected thereto. The powertrain 12 may be a hybrid system combining the engine 16 with one or more electric motor/generators, which are not shown, but the existence of which may be envisioned by those skilled in the art.

Figure 2:
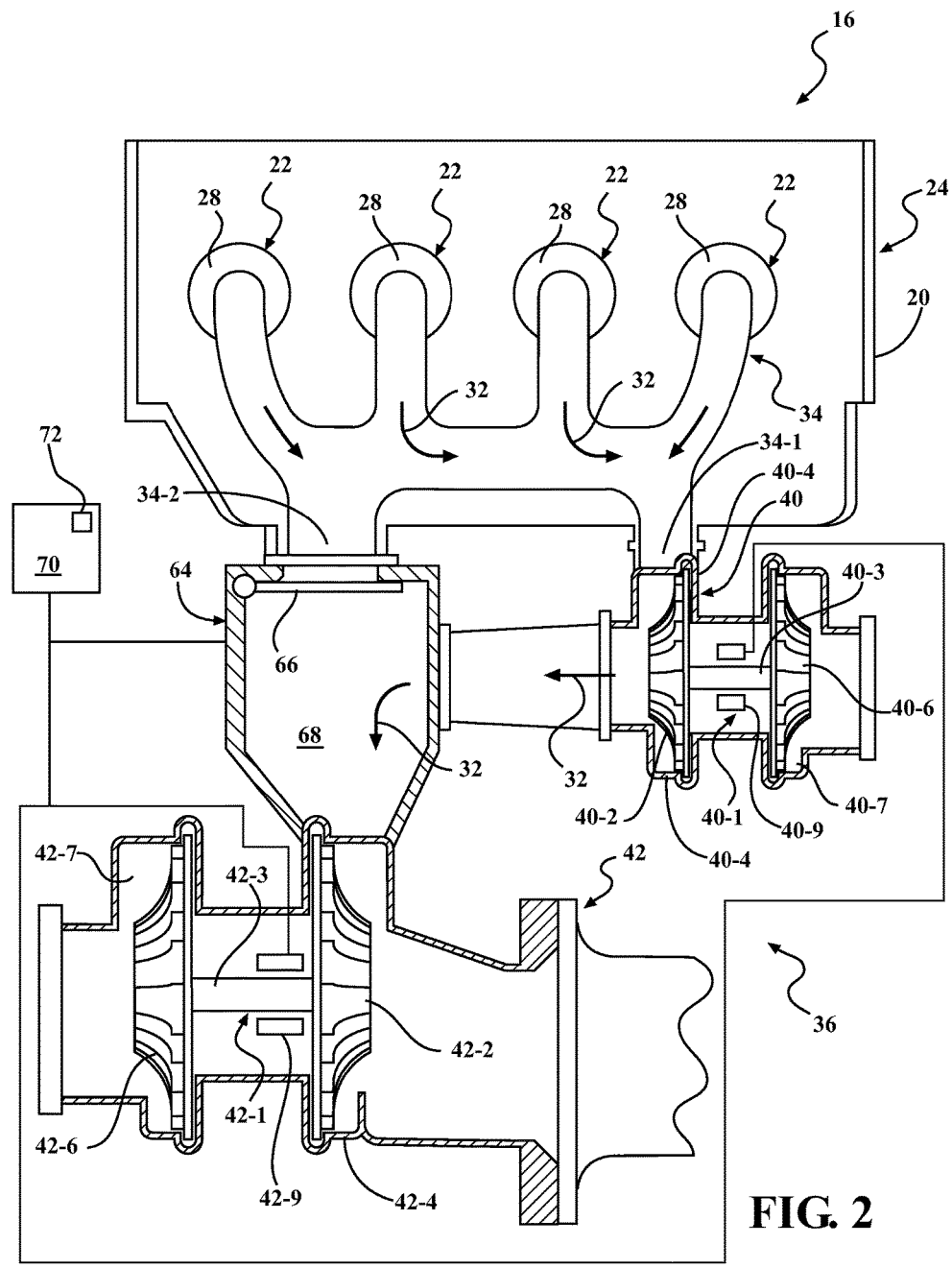
FIG. 2 is a schematic partially cross-sectional top view of the engine with the two-stage turbocharging system, as shown in FIG. 1, including motor-generators incorporated into respective turbochargers depicted in one mode of operation according to the disclosure.
Figure 3:
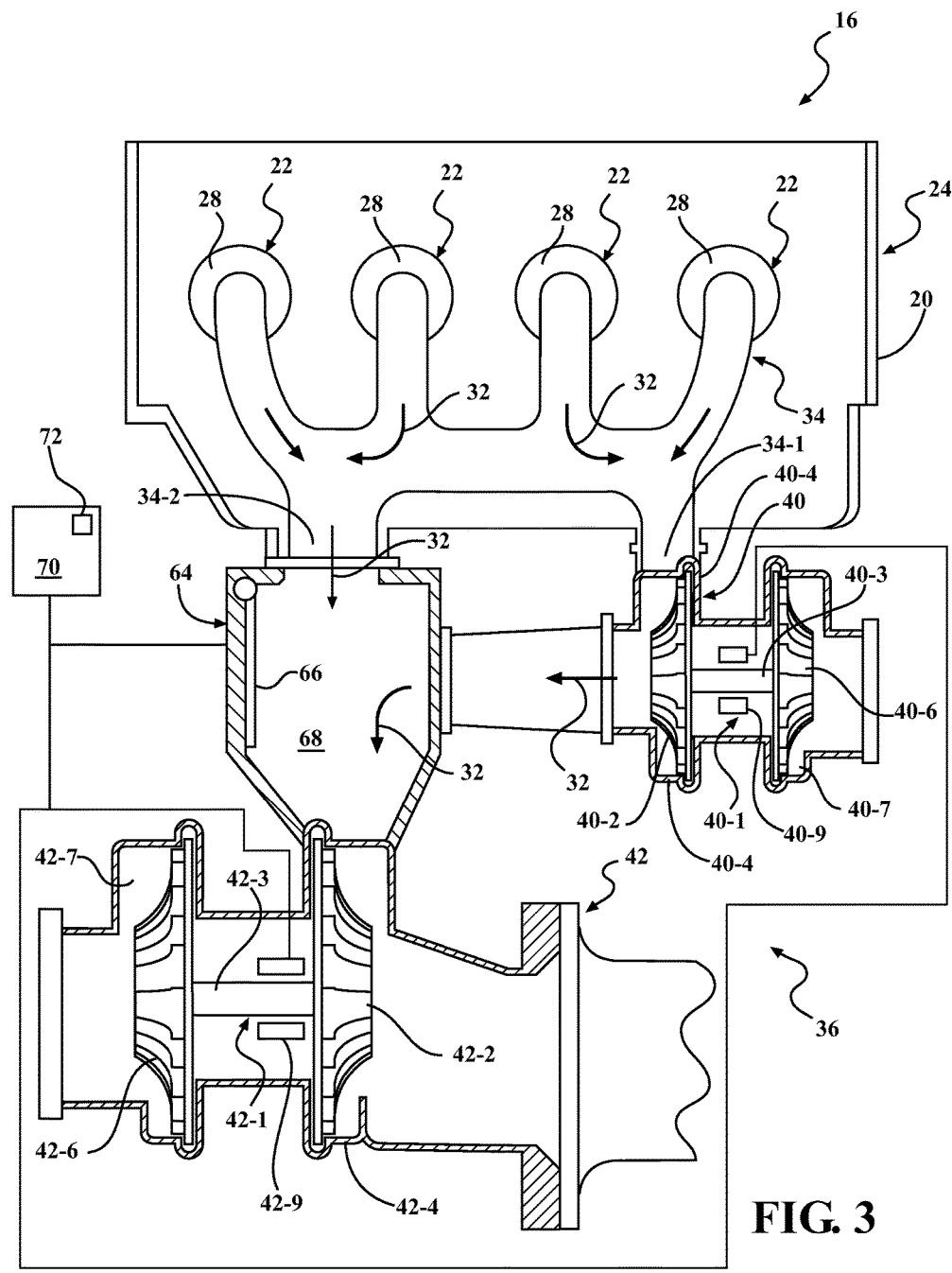
FIG. 3 is a schematic partially cross-sectional top view of the engine with the two-stage turbocharging system, as shown in FIG. 1, including motor-generators incorporated into respective turbochargers depicted in another mode of operation according to the disclosure.

As shown in FIG. 2, the engine 16 includes a cylinder block 20 with a plurality of cylinders 22 arranged therein and a cylinder head 24 that is mounted on the cylinder block. As shown in FIGS. 2-3, the cylinder head 24 may be integrated into or cast together with the cylinder block 20. The cylinder head 24 receives air and fuel to be used inside the cylinders 22 for subsequent combustion. Each cylinder 22 includes a piston, which is not specifically shown, but known to those skilled in the art to reciprocate therein. Combustion chambers 28 are formed within the cylinders 22 between the bottom surface of the cylinder head 24 and the tops of the pistons. As known by those skilled in the art, each of the combustion chambers 28 receives fuel and air from the cylinder head 24 that form a fuel-air mixture for subsequent combustion inside the subject combustion chamber. Although an in-line four-cylinder engine is shown, nothing precludes the present disclosure from being applied to an engine having a different number and/or arrangement of cylinders.

A first fluid pump 26 and a second fluid pump 30 are arranged on the engine 10. The first fluid pump 26 is configured to circulate pressurized coolant 27 to remove heat from various subsystems and components, such as pistons and valves, of the engine 10, as understood by those skilled in the art. The second fluid pump 30 is configured to circulate pressurized oil 31 for lubricating sensitive components, such as bearings, of the engine 16. Each of the first and second fluid pumps 26, 30 may be driven mechanically, directly by rotating engine components of the engine 16, such as the crankshaft, or by a respective electric motor (not shown).

The engine 16 also includes a crankshaft (not shown) configured to rotate within the cylinder block 20. As known to those skilled in the art, the crankshaft is rotated by the pistons as a result of an appropriately proportioned fuel-air mixture being burned in the combustion chambers 28. After the air-fuel mixture is burned inside a specific combustion chamber 28, the reciprocating motion of a particular piston serves to exhaust post-combustion gasses 32 from the respective cylinder 22. The cylinder head 24 is also configured to exhaust post-combustion gasses 32 from the combustion chambers 28 via an exhaust manifold 34. As shown in FIGS. 2-3, the exhaust manifold 34 may be internally cast, i.e., integrated, into the cylinder head 24. Exhaust runners from different cylinders 22 are joined together in the exhaust manifold 34, thus allowing two separate outlets, a first outlet 34-1 and a second outlet 34-2, to be formed for scavenging the exhaust post-combustion gasses 32 from all cylinders 22.

The engine 16 also includes a turbocharging system 36 configured to develop boost pressure, i.e., pressurize an airflow 38 that is received from the ambient, for delivery to the cylinders 22. The turbocharging system 36 is configured as a two-stage forced induction arrangement for the engine 16. The turbocharging system 36 includes a low-flow, a.k.a., high-pressure, turbocharger 40 that is in fluid communication with the exhaust manifold 34 and configured to be driven by the post-combustion gasses 32 from the first outlet 34-1. The low-flow turbocharger 40 pressurizes and discharges the airflow 38 to the cylinders 22 at lower flow rates of the post-combustion gasses 32, which are typically generated at lower rotational speeds, such as below approximately 3,000 RPM, of the engine 16.

The turbocharging system 36 also includes a high-flow, a.k.a., low-pressure, turbocharger 42 that is in fluid communication with the exhaust manifold 34 and configured to be driven by the post-combustion gasses 32 from the second outlet 34-2. The high-flow turbocharger 42 pressurizes and discharges the airflow 38 to the cylinders 22 at higher flow rates of the post-combustion gasses 32, which are typically generated at intermediate and higher rotational speeds, such as around 3,000 RPM and above, of the engine 16. To support such distinct engine speed ranges and rates of airflow 38, the low-flow turbocharger 40 is typically sized comparatively smaller, and thus has a smaller rotating inertia than the high-flow turbocharger 42. The turbocharging system 36 may also employ a bypass (not shown) with a check valve or an actively controlled valve to permit the pressurized airflow 38 to be routed from the high-flow turbocharger 42 to the cylinders 22 when flow rates exceed limits of the low-flow turbocharger 40. As such, the exhaust manifold 34 is operatively connected to the cylinder head 24, while the two separate outlets 34-1 and 34-2 permit two turbochargers 40, 42 to be mounted sufficiently apart.

Generally, in a two-stage forced induction arrangement the output pressure from multiple turbochargers is greater than can be provided by a single turbocharger. Such a two-stage forced induction arrangement may be configured to operate as a sequential system, wherein at least in some, typically higher, engine speed ranges both low- and high-flow turbochargers operate simultaneously, i.e., with operational overlap. A two-stage forced induction arrangement may also be configured to generate boost pressure as a staged system, i.e., where the low- and high-flow turbochargers generate boost pressure in sequence, without any operational overlap. In such two-stage forced induction arrangements, the first, larger flow turbocharger boosts intake air pressure as much as possible, for example to three times the intake pressure, and the subsequent smaller flow turbocharger(s) takes the intake air charge from the previous stage and compresses it further, for example to an additional three times intake pressure, for a total boost of nine times atmospheric pressure.

Figure 4:
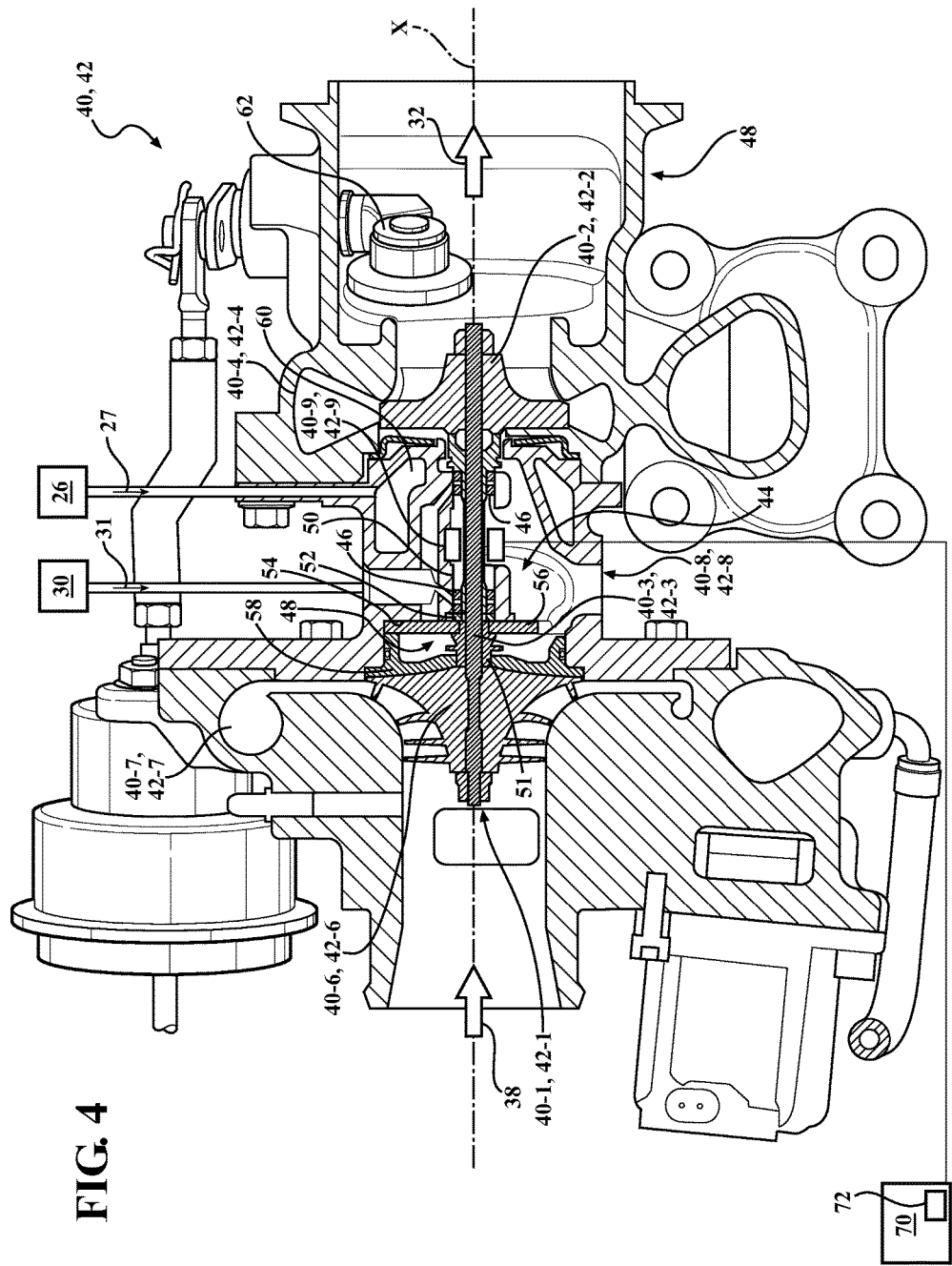
FIG. 4 is a schematic cross-sectional view of a representative turbocharger as employed in the two-stage turbocharging system shown in FIGS. 1-3.

As shown in FIG. 4, each of the turbochargers 40 and 42 includes a rotating assembly, rotating assembly 40-1 and rotating assembly 42-1, respectively. The rotating assemblies 40-1 and 42-1 include respective turbine wheels 40-2 and 42-2 mounted on shafts 40-3 and 42-3, respectively. The turbine wheels 40-2 and 42-2 are configured to be rotated along with the respective shafts 40-3, 42-3 by post-combustion gasses 32 emitted from the cylinders 22. The rotating assembly 42-1 is physically larger than rotating assembly 40-1 such that the high-flow turbocharger 42 may generate the comparatively higher airflow rates required therefrom. The turbine wheels 40-2 and 42-2 are typically constructed from a temperature and oxidation resistant material, such as a nickel-chromium-based "inconel" super-alloy, to reliably withstand temperatures of the post-combustion gasses 32, which in some engines may approach 2,000 degrees Fahrenheit.

The turbine wheels 40-2 and 42-2 are disposed inside respective turbine housings 40-4 and 42-4 that are typically constructed from cast iron or steel and include an appropriately configured, i.e., designed and sized, respective turbine volutes or scrolls. The turbine scrolls of the turbine housings 40-4 and 42-4 receive the post-combustion gasses 32 and direct the gasses to the respective turbine wheels 40-2 and 42-2. The turbine scrolls are configured to achieve specific performance characteristics, such as efficiency and response, of the respective turbocharger 40 and 42. Each of the turbine housings 40-4 and 42-4 may also include an integrated waste-gate valve (not shown) to facilitate more precise control over boost pressures generated by the turbocharging system 36, as well as the transition and overlap between operation of the low-flow turbocharger 40 and the high-flow turbocharger 42. However, a flow control device 64 that is described in detail below may serve as a waste-gate for the low-flow turbocharger 40.

Each rotating assembly 40-1, 42-1 also includes a compressor wheel 40-6 and 42-6 mounted on the respective shaft 40-3, 42-3. The compressor wheels 40-6 and 42-6 are configured to pressurize the airflow 38 being received from the ambient for eventual delivery to the cylinders 22. The compressor wheels 40-6 and 42-6 are disposed inside a respective compressor cover 40-7 and 42-7. Each compressor cover 40-7, 42-7 is typically constructed from aluminum and includes a respective compressor volute or scroll. As understood by those skilled in the art, the variable flow and force of the post-combustion gasses 32 influences the amount of boost pressure that may be generated by each compressor wheel 40-6 and 42-6 of the respective turbochargers 40 and 42 throughout the operating range of the engine 16. Each compressor wheel 40-6, 42-6 is typically formed from a high-strength aluminum alloy that provides the compressor wheel with reduced rotating inertia and quicker spin-up response.

Each of the turbochargers 40 and 42 includes a bearing system 44 configured to support the respective rotating assemblies 40-1 and 42-1. The bearing systems 44 of the turbochargers 40 and 42 are mounted in respective bores 50 along the axis X within respective bearing housings 40-8 and 42-8. The bearing housings 40-8 and 42-8 may be formed from a suitable robust material, such as an aluminum-silicon alloy or a nodular cast iron, capable of withstanding appropriate thermal and mechanical stresses, and maintain dimensional stability of the bore 50 for operational support of the respective rotating assemblies 40-1 and 42-1. The bearing system 44 in each turbocharger 40, 42 may include journal bearings 46 and thrust bearing assembly 48, both of which are described in detail below.

Specifically, each rotating assembly 40-1, 42-1 is generally supported for rotation about the axis X via a set of journal bearings 46. The journal bearings 46 are mounted in the bore 50 along the axis X within a respective bearing housing 40-8 and 42-8 and is cooled by the pressurized coolant 27 supplied via the first fluid pump 26 and lubricated by the pressurized oil 31 supplied via the second fluid pump 30. The journal bearings 46 are configured to control radial motion and vibrations of the respective shafts 40-3, 42-3. The journal bearings 46 may be formed from a relatively soft metal, for example brass or bronze, such that any debris that passes through the bearing housings 40-8, 42-8 would become embedded in the soft bearing material and not damage the respective shafts 40-3, 42-3 or the bores 50.

Additionally, the bearing system 44 of each turbocharger 40, 42 includes a thrust bearing assembly 48. Each thrust bearing assembly 48 is configured to absorb thrust forces generated by the respective rotating assembly 40-1, 42-1 while the turbocharger 40, 42 is pressurizing the airflow 38. As shown in FIG. 4, the thrust bearing assembly 48 includes a thrust collar 51 and a thrust washer 52. Each bearing housing 40-8, 42-8 includes a thrust wall 54. The thrust bearing assembly 48 also includes a thrust plate 56 that is held in place by a thrust retainer 58 against the thrust wall 54. The bearing surface of the thrust plate 56 is typically formed from a relatively soft metal, for example brass or bronze, such that any debris that passes through the bearing housings 40-8, 42-8 would become embedded in the soft bearing material and not damage the thrust collar 51 or the thrust washer 52. The thrust retainer 58 may be held in place by a clip, one or more bolts, or otherwise attached to the respective bearing housing 40-8, 42-8, in order to hold the thrust bearing assembly 48 securely against the thrust wall 54.

During operation of the turbochargers 40 and 42, the pressurized oil 31 supplied via the second pump 30 is delivered to the bearing housing 40-8, 42-8. Inside the respective bearing housing 40-8, 42-8, the pressurized oil 31 is directed via dedicated cast passages to lubricate the thrust bearing assembly 48 and generate an oil film between the thrust washer 52 and the thrust plate 56. Such an oil film serves to reduce the likelihood of direct physical contact between the thrust washer 52 and the thrust plate 56. In turn, such reduction of direct contact between the thrust washer 52 and the thrust plate 56 serves to extend useful life of the thrust bearing assembly 48 and, accordingly, the durability of the respective turbocharger 40, 42. Additionally, the pressurized coolant 27 supplied via the first fluid pump 26 circulates through a coolant jacket 60 formed, such as cast, within the respective bearing housing 40-8 and 42-8 of the specific turbocharger 40, 42. Such specifically configured coolant jackets 60 serve to remove heat energy from the journal bearings 46 and the thrust bearing assembly 48 during operation of the respective turbochargers 40, 42.

The low-flow turbocharger 40 also includes a first motor-generator 40-9. The first motor-generator 40-9 is configured to selectively assist the post-combustion gasses 32 in driving the low-flow turbocharger 40 and generate an electric current when driven via the low-flow turbocharger. As shown in FIGS. 2-4, the first motor-generator 40-9 can be incorporated into the bearing housing 40-8 of the low-flow turbocharger 40.

Similarly to the low-flow turbocharger 40, the high-flow turbocharger 42 can include a second motor-generator 42-9, as is also shown in FIGS. 2-4. Analogous to the first motor-generator 40-9, the second motor-generator 42-9 is configured to selectively assist the post-combustion gasses 32 in driving the high-flow turbocharger 42 and generate an electric current when driven via the high-flow turbocharger. As shown, the second motor-generator 42-9 can be incorporated into the bearing housing 42-8 of the high-flow turbocharger 42. The first and the second motor-generators 40-9, 42-9 can be sized same or differently. For example, the second motor-generator 42-9 may be physically larger, have greater torque capacity, and be configured to generate greater electric current than the first motor-generator 40-9. Accordingly, and as necessitated by the desired performance of the engine 16, the first motor-generator 40-9 may be operatively connected to and incorporated into the high-flow turbocharger 42, while the second motor-generators 42-9 may be operatively connected to and incorporated into the low-flow turbocharger 40.

As noted above, the journal bearings 46 and the thrust bearing assembly 48 of each turbocharger 40, 42 are cooled by the pressurized coolant 27 circulated through the respective coolant jackets 60. To take advantage of the cooling provided within the bearing housings 40-8, 42-8, the first motor-generator 40-9 and the second motor-generator 42-9 can be arranged within the respective bearing housings specifically proximate to the coolant jacket 60 for effective cooling thereby. Such convective cooling of the first and second motor-generators 40-9, 42-9 is intended to facilitate reliable performance of the motor-generators.

The engine 16 additionally includes an induction system that may include an air duct and an air filter upstream of the turbochargers 40, 42 configured to channel the airflow 38 from the ambient to the turbocharging system 36. Although the induction system is not shown, the existence of such would be appreciated by those skilled in the art. Each of the turbochargers 40, 42 may also be fluidly connected to an intake manifold (not shown) that is configured to distribute the pressurized airflow 38 to each of the cylinders 22 for mixing with an appropriate amount of fuel and subsequent combustion of the resultant fuel-air mixture.

As shown in FIGS. 2-3, the turbocharging system 36 also includes a flow control device 64. The flow control device 64 is mounted to the cylinder head 24, and is attached directly to and is in fluid communication with the second outlet 34-2 of the exhaust manifold 34. The high-flow turbocharger 42 is mounted to the flow control device 64 such that the post-combustion gasses 32 may only access the high-flow turbocharger by first passing through the flow control device. A fluid flow path out of the first manifold outlet 34-1 is maintained unobstructed so as to supply the post-combustion gasses 32 to the low-flow turbocharger 40, while another fluid flow path from the second manifold outlet 34-2 is connected to the flow control device 64.

The flow control device 64 includes a valve 66 and a chamber 68, and is used to selectively open and close the fluid flow path from the second manifold outlet 34-2 into the high-flow turbocharger 42. The flow control device 64 is also open, i.e., fluidly connected with the low-flow turbine housing 40-4. As shown, the valve 66 may be configured as a door designed to pivot around an axis Y in order to selectively open and close the flow control device 64. When the flow control device 64 is closed and the valve 66 blocks the second manifold outlet 34-2, the post-combustion gasses 32 naturally flow into the low-flow turbocharger 40. Following the low-flow turbocharger 40, the post-combustion gasses 32 is exited from the low-flow turbine housing 40-4 into the high-flow turbine housing 42-4, downstream of the valve 66. On the other hand, because the chamber 68 is fluidly connected to the low-flow turbine housing 40-4, when the valve 66 fully opens the second manifold outlet 34-2, pressure across the two sides of the low-flow turbine housing 40-4 equalizes, the post-combustion gasses 32 will naturally flow into the high-flow turbine housing 42-4.

The valve 66 can be sized in order to select the operational transition point between low-flow turbine wheel 40-2 and high-flow turbine wheel 42-2. Also, opening into the flow control device 64 may be modulated via the valve 66 to adjust or vary the flow of post-combustion gasses 32 through the low-flow turbine housing 40-4, thus varying the amount of overlap between operation of the low- and high-flow turbochargers 40, 42. Also the relative sizes of the low- and high-flow turbine housings 40-4, 42-4 are selected to vary the operation transition point between low-flow turbine wheel 40-2 and high-flow turbine wheel 42-2. Accordingly, the opening into the chamber 68 of the valve 66 can also be controlled to effect sequential operation of the two turbochargers 40, 42. Through such an arrangement, the flow control device 64 is configured to selectively direct the post-combustion gasses 32 to the low-flow turbocharger 40 and the high-flow turbocharger 42, thus effectively transitioning between the low-flow turbocharger and the high-flow turbocharger during operation of the engine 16.

The vehicle 10 may additionally include a programmable controller 70 configured to regulate operation of the engine, such as by controlling an amount of fuel being injected into the cylinders 22 for mixing and subsequent combustion with the pressurized airflow 38. The controller 70 may be configured as a central processing unit (CPU) configured to regulate operation of the internal combustion engine 16 (shown in FIG. 1), a hybrid-electric powertrain (not shown), or other alternative types of powerplants, as well as other vehicle systems, or a dedicated controller. In order to appropriately control operation of the engine 16, the controller 70 includes a memory, at least some of which is tangible and non-transitory. The memory may be any recordable medium that participates in providing computer-readable data or process instructions. Such a medium may take many forms, including but not limited to non-volatile media and volatile media.

Non-volatile media for the controller 70 may include, for example, optical or magnetic disks, and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 70 may also include a floppy disk, a flexible disk, hard disk, magnetic tape, any other magnetic medium, a CD-ROM, DVD, any other optical medium, etc. The controller 70 can be configured or equipped with other required computer hardware, such as a high-speed clock, requisite Analog-to-Digital (A/D) and/or Digital-to-Analog (D/A) circuitry, any necessary input/output circuitry and devices (I/O), as well as appropriate signal conditioning and/or buffer circuitry. Any algorithms required by the controller 70 or accessible thereby may be stored in the memory and automatically executed to provide the required functionality.

The controller 70 is also configured to regulate the flow control device 64. More particularly, the controller 70 is programmed to close the flow control device 64 (as shown in FIG. 2) to direct the post-combustion gasses 32 to the low-flow turbocharger 40 and open the control valve (as shown in FIG. 3) to direct the post-combustion gasses to the high-flow turbocharger 42 depending on operating parameters, such as the load, temperature, and rotational speed, of the engine 16. Accordingly, the controller 70 may be programmed to close the flow control device 64 below a predetermined flow rate 72 of the post-combustion gasses 32 and open the control valve at or above the predetermined flow rate.

The predetermined flow rate 72 of the post-combustion gasses 32 may be a specific flow rate value below which the post-combustion gasses of the subject engine 16 have sufficient energy to spin the low-flow turbocharger 40 up at a desired rate in order to provide the desired boost pressure within a desired timeframe, but insufficient to similarly spin up the higher inertia high-flow turbocharger 42. The subject predetermined flow rate 72 of the post-combustion gasses 32 may be identified through calculations and then verified through an empirical procedure during testing of the actual engine 16, both on a test stand and in the vehicle 10.

The controller 70 can additionally be configured to regulate and coordinate operation of the flow control device 64, the first motor-generator 40-9, and the second motor-generator 42-9. Specifically, the controller 70 can be programmed to close the flow control device 64 and selectively operate the first motor-generator 40-9 to assist the post-combustion gasses 32 in driving the low-flow turbocharger 40 below the predetermined flow rate 72 of the post-combustion gasses 32. Additionally, the controller 70 can be programmed to open the flow control device 64 at or above the predetermined flow rate 72 of the post-combustion gasses 32 and selectively operate the second motor-generator 42-9 to generate the electric current when driven via the high-flow turbocharger 42. The controller 70 can also be programmed to close an optional waste-gate 62 (shown in FIG. 4) on the high-flow turbocharger 42, if so equipped, when the second motor-generator 42-9 is operated to generate electric current. The vehicle 10 may also include an electrical energy storage device 74, such as one or more batteries. The controller 70 may be additionally programmed to direct the electric current generated by each of the first motor-generator 40-9 and the second motor-generator 42-9 to the electrical energy storage device 74.

Since the low-flow turbocharger 40 is sized for operation at lower flow rates of the post-combustion gasses 32, electrical assist to the low-flow turbocharger can provide significant benefit during transient operation of the engine 16 at lower engine speeds, such as during vehicle launch, by accelerating buildup of boost pressure in the cylinders 22 and improving engine response via the first motor-generator 40-9. Once the rotational speed of the engine 16 has reached a value at which the flow of post-combustion gasses 32 is sufficient to drive the low-flow turbocharger 40, the operation of the low-flow turbocharger will be sustained by the exhaust flow and the first motor-generator 40-9 can be switched off. On the other hand, once operation of the low-flow turbocharger 40 can be sustained by the exhaust flow, the first motor-generator 40-9 can be operated in the generator mode, such as during highway cruising of the vehicle 10. Additionally, because the high-flow turbocharger 42 is sized for operation at higher flow rates of the post-combustion gasses 32, electrical assist to the high-flow turbocharger for transient engine/vehicle maneuver is likely to be less frequent, as compared with the above-described electrical assist to the low-flow turbocharger 40. However, the second motor-generator 42-9 in the low-pressure turbocharger can be operated more frequently in the generator mode for electrical power generation.

Figure 5:
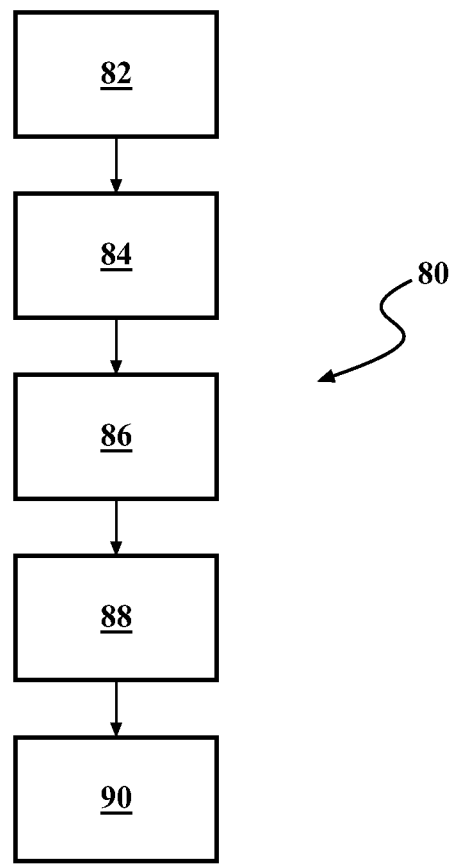
FIG. 5 is a flow chart illustrating a method of controlling an internal combustion engine according to the present disclosure.

FIG. 5 depicts a method 80 of controlling the internal combustion engine 16 as described above with respect to FIGS. 1-4. The method commences in frame 82 with detecting operation of the engine 16. After frame 82, the method advances to frame 84, where it includes closing the flow control device 64 to drive the low-flow turbocharger 40 by the post-combustion gasses 32 from the first outlet 34-1 of the exhaust manifold 34 in order to pressurize the airflow 38 and discharge the pressurized airflow to the cylinders 22. Following frame 84, the method proceeds to frame 86, where the method includes operating the first motor-generator 40-9 to assist the post-combustion gasses 32 in driving the low-flow turbocharger 40 or generate electric current when driven via the low-flow turbocharger. As described above, the first motor-generator 40-9 can be used to assist in driving the low-flow turbocharger 40 below the predetermined flow rate 72 of the post-combustion gasses 32.

After frame 86, the method advances to frame 88, where it includes opening the flow control device 64 to drive the high-flow turbocharger 42 by the post-combustion gasses 32 from a second outlet 34-2 of the exhaust manifold 34 in order to pressurize the airflow 38 and discharge the pressurized airflow to the cylinders 22. Following frame 88, the method advances to frame 90, where it includes operating the second motor-generator 42-9 to assist the post-combustion gasses 32 in driving the high-flow turbocharger 42 or generate electric current when driven via the high-flow turbocharger. As described above, the second motor-generator 42-9 can be used to generate electric current when driven via the high-flow turbocharger 42 at or above the predetermined flow rate 72 of the post-combustion gasses 32. Following any of the frames 84-90, the method may loop back to any other frame to control operation of the respective first motor-generator 40-9 and second motor-generator 42-9 in any of the above-described modes.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A method of controlling an internal combustion engine including an exhaust manifold configured to exhaust post-combustion gasses therefrom in a vehicle including a programmable controller, the method comprising:

closing a flow control device via the controller to drive a low-flow turbocharger by the post-combustion gasses from a first outlet of the exhaust manifold in order to pressurize the airflow and discharge the pressurized airflow to the cylinder;

operating a first motor-generator via the controller to selectively assist the post-combustion gasses in driving the low-flow turbocharger and generate electric current when driven via the low-flow turbocharger;

opening the flow control device via the controller to drive a high-flow turbocharger by the post-combustion gasses from a second outlet of the exhaust manifold in order to pressurize the airflow and discharge the pressurized airflow to the cylinder;

operating a second motor-generator via the controller to selectively assist the post-combustion gasses in driving the high-flow turbocharger and generate electric current when driven via the high-flow turbocharger;

closing, via the controller, the flow control device below a predetermined flow rate of the post-combustion gasses; and opening, via the controller, the flow control device at or above the predetermined flow rate of the post-combustion gasses.

2. The method of claim 1, wherein each of the low-flow turbocharger and high-flow turbocharger includes a bearing system arranged inside a bearing housing and configured to support rotating components of the respective low-flow and high-flow turbochargers, and wherein each of the first and second motor-generators is arranged inside the respective bearing housing of the low-flow and high-flow turbochargers.

3. The method of claim 2, wherein the bearing housing of each of the low-flow turbocharger and high-flow turbocharger includes a coolant jacket, further comprising cooling the first motor-generator and the second motor-generator by the respective coolant jackets of the low-flow turbocharger and high-flow turbocharger.

4. The method of claim 1, further comprising:
selectively operating, via the controller, the first motor-generator to assist the post-combustion gasses in driving the low-flow turbocharger below the predetermined flow rate of the post-combustion gasses; and
selectively operating, via the controller, the second motor-generator to generate electric current when driven via the high-flow turbocharger at or above the predetermined flow rate of the post-combustion gasses.

5. The method of claim 1, wherein the vehicle additionally includes an electrical energy storage device, further comprising directing, via the controller, the electric current generated by each of the first motor-generator and the second motor-generator to the energy storage device.

6. An internal combustion engine comprising:
a cylinder block defining a cylinder;
a cylinder head mounted to the cylinder block and configured to supply air and fuel to the cylinder for combustion therein;
an exhaust manifold operatively connected to the cylinder head and having a first outlet and a second outlet, wherein each of the first and second outlets is configured to exhaust post-combustion gasses from the cylinder; and
a turbocharging system configured to pressurize an airflow being received from the ambient for delivery to the cylinder, the turbocharging system including:
a low-flow turbocharger configured to be driven by the post-combustion gasses from the first outlet in order to pressurize the airflow and discharge the pressurized airflow to the cylinder;
a high-flow turbocharger configured to be driven by the post-combustion gasses from the second outlet in order to pressurize the airflow and discharge the pressurized airflow to the cylinder;
a flow control device configured to selectively direct the post-combustion gasses to the low-flow turbocharger and the high-flow turbocharger; and
a first motor-generator operatively connected to one of the low-flow turbocharger and high-flow turbocharger and configured to selectively assist the post-combustion gasses in driving said one turbocharger and generate electric current when driven via said one turbocharger;
a second motor-generator configured to selectively assist the post-combustion gasses in driving the other of the low-flow turbocharger and high-flow turbocharger and generate electric current when driven via the other of the low-flow turbocharger and high-flow turbocharger; and a programmable controller configured to regulate and coordinate operation of the flow control device, the first motor-generator, and the second motor-generator, and programmed to:
close the flow control device and selectively operate the first motor-generator to assist the post-combustion gasses in driving the low-flow turbocharger below a predetermined flow rate of the post-combustion gasses; and
open the flow control device at or above the predetermined flow rate of the post-combustion gasses and selectively operate the second motor-generator to generate electric current when driven via the high-flow turbocharger.

7. The engine of claim 1, wherein each of the low-flow turbocharger and high-flow turbocharger includes a bearing system arranged inside a bearing housing and configured to support rotating components of the respective low-flow and high-flow turbochargers, and wherein each of the first and second motor-generators is arranged inside the respective bearing housing of the low-flow and high-flow turbochargers.

8. The engine of claim 7, wherein the bearing housing of each of the low-flow turbocharger and high-flow turbocharger includes a coolant jacket, and wherein the first motor-generator and the second motor-generator are cooled by the respective coolant jackets of the low-flow turbocharger and high-flow turbocharger.

9. The engine of claim 1, wherein the engine is employed in a vehicle having an electrical energy storage device and the controller is additionally programmed to direct the electric current generated by each of the first motor-generator and the second motor-generator to the energy storage device.

10. A vehicle comprising:
a driven wheel; and
a powertrain including an internal combustion engine and a transmission assembly operatively connected to the engine and configured to transmit engine torque to the driven wheel, the engine including:
a cylinder block defining a cylinder;
a cylinder head mounted to the cylinder block and configured to supply air and fuel to the cylinder for combustion therein;
an exhaust manifold operatively connected to the cylinder head and having a first outlet and a second outlet, wherein each of the first and second outlets is configured to exhaust post-combustion gasses from the cylinder; and
a turbocharging system configured to pressurize an airflow being received from the ambient for delivery to the cylinder, the turbocharging system including:
a low-flow turbocharger configured to be driven by the post-combustion gasses from the first outlet in order to pressurize the airflow and discharge the pressurized airflow to the cylinder;
a high-flow turbocharger configured to be driven by the post-combustion gasses from the second outlet in order to pressurize the airflow and discharge the pressurized airflow to the cylinder;
a flow control device configured to selectively direct the post-combustion gasses to the low-flow turbocharger and the high-flow turbocharger; and
a first motor-generator operatively connected to one of the low-flow turbocharger and high-flow turbocharger and configured to selectively assist the post-combustion gasses in driving said one turbocharger and generate electric current when driven via said one turbocharger a second motor-generator configured to selectively assist the post-combustion gasses in driving the other of the low-flow turbocharger and high-flow turbocharger and generate electric current when driven via the other of the low-flow turbocharger and high-flow turbocharger; and a programmable controller configured to regulate and coordinate operation of the flow control device, the first motor-generator, and the second motor-generator, and programmed to:

close the flow control device and selectively operate the first motor-generator to assist the post-combustion gasses in driving the low-flow turbocharger below a predetermined flow rate of the post-combustion gasses; and open the flow control device at or above the predetermined flow rate of the post-combustion gasses and selectively operate the second motor-generator to generate electric current when driven via the high-flow turbocharger.

11. The vehicle of claim 10, wherein each of the low-flow turbocharger and high-flow turbocharger includes a bearing system arranged inside a bearing housing and configured to support rotating components of the respective low-flow and high-flow turbochargers, and wherein each of the first and second motor-generators is arranged inside the respective bearing housing of the low-flow and high-flow turbochargers.

12. The vehicle of claim 11, wherein the bearing housing of each of the low-flow turbocharger and high-flow turbocharger includes a coolant jacket, and wherein the first motor-generator and the second motor-generator are cooled by the respective coolant jackets of the low-flow turbocharger and high-flow turbocharger.

13. The vehicle of claim 10, further comprising an electrical energy storage device, wherein the controller is additionally programmed to direct the electric current generated by each of the first motor-generator and the second motor-generator to the energy storage device.

* * * * *